(12) United States Patent
Seymour

(10) Patent No.: US 6,833,936 B1
(45) Date of Patent: Dec. 21, 2004

(54) METHOD AND APPARATUS FOR CAPTURING INFORMATION FROM A DOCUMENT

(75) Inventor: Edward Michael Seymour, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 09/717,810

(22) Filed: Nov. 21, 2000

(51) Int. Cl.⁷ .......................... H04N 1/024; H04N 1/04; G03F 3/10

(52) U.S. Cl. ...................... 358/473; 358/474; 358/527; 358/484; 358/453

(58) Field of Search ................................ 358/473, 472, 358/497, 494, 496, 474, 488, 486, 487, 471, 527, 505, 506, 512, 514, 513, 453; 382/312, 313, 319, 318; 250/208.1, 234–236; 399/377–380, 211; 355/40, 75

(56) References Cited

U.S. PATENT DOCUMENTS

| | | | | |
|---|---|---|---|---|
| 6,049,376 A | * | 4/2000 | Reele et al. .................. 355/75 |
| 6,081,629 A | * | 6/2000 | Browning .................... 382/313 |
| 6,271,939 B1 | * | 8/2001 | Hu et al. ..................... 358/497 |
| 6,707,581 B1 | * | 3/2004 | Browning .................... 358/473 |
| 6,785,025 B1 | * | 8/2004 | Dawe et al. ................. 358/474 |

* cited by examiner

*Primary Examiner*—Cheukfan Lee
(74) *Attorney, Agent, or Firm*—Mark E. McBurney; Anthony V S England

(57) ABSTRACT

In one embodiment, a device for capturing information from a document to be input to an information handling system ("IHS") includes a housing that a user may selectively place to reveal a first portion of the document. That is, the housing defines a viewing area, such as by defining an opening through which the first portion of the document may be viewed. The housing has a shutter for selecting a subportion of the first revealed portion of the document by shutting off a portion of the viewing area, thereby hiding a portion of the first revealed portion of the document and revealing only the selected subportion. A scanner for capturing an image of the revealed subportion of the document is movably attached to the housing. In another aspect, the input device includes a magnifying lens for displaying an enlarged view of the portion of the document revealed in the viewing area, so that a user of the input device may more precisely select the subportion of the document. This is particularly helpful for users which are visually impaired.

23 Claims, 9 Drawing Sheets

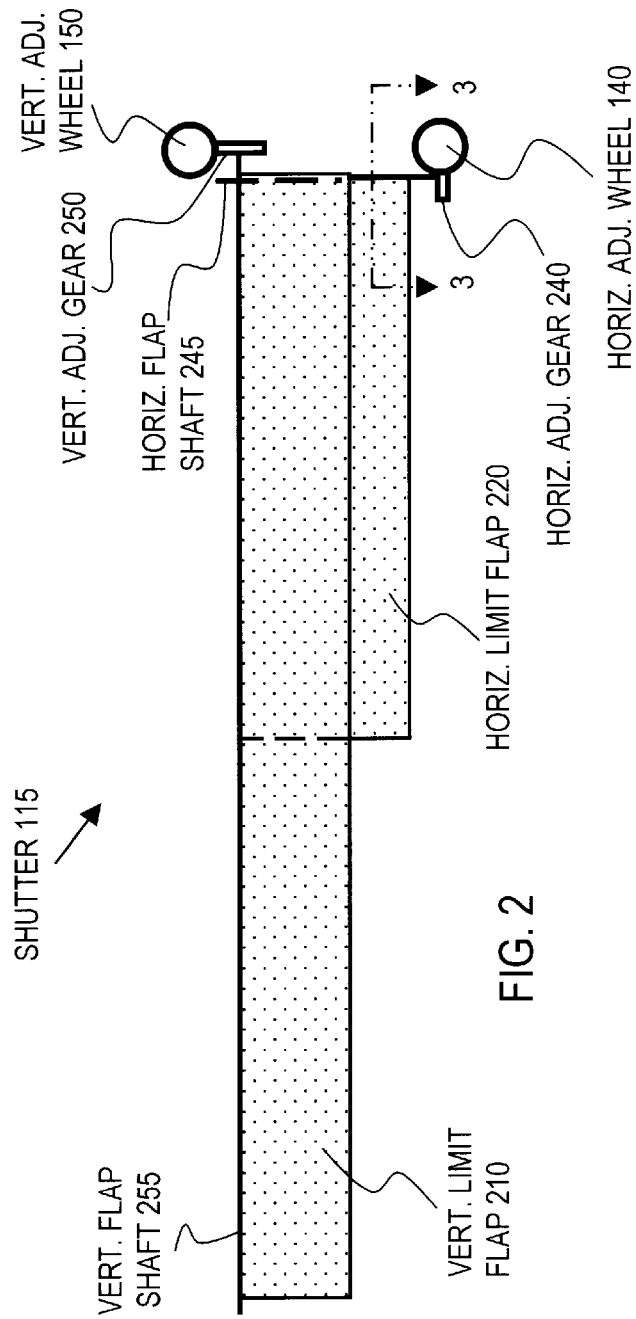
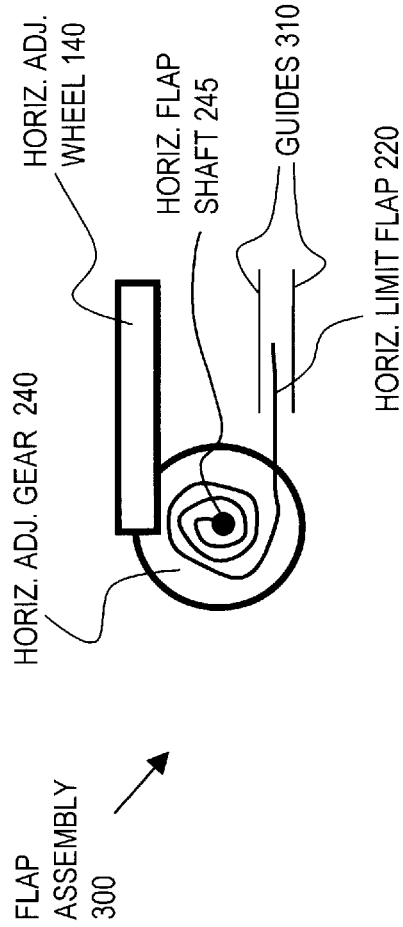

METHOD AND APPARATUS FOR CAPTURING INFORMATION FROM A DOCUMENT

BACKGROUND

1. Field of the Invention

The present invention relates generally to input devices for capturing information on a document, and may relate more particularly to capturing the information with an optical scanner. A specific application includes capturing such information, where the information includes a network address, transmitting the information to an information handling system, and accessing the information at network address.

2. Description of Related Art

It is well known to scan information into an information handling system using a hand-held or stationary scanner. For example, a common use of scanners for home computer users is to scan photographs for sending to family members attached to e-mail. Hand-held scanners are used by grocery store stock personnel and stationary scanners are used at grocery store checkout counters to scan product codes.

Recently, a hand-held scanning device referred to as a ":Cue :C.A.T." (trademark of Digital Convergence.Com Inc.) has been widely distributed free of charge to consumers for coupling to a home computer to scan in product codes and the like on publications and product labels. The accompanying software distributed with the :Cue :C.A.T. converts the codes to Internet addresses, so that publishers and others can direct consumers to their web sites. This is especially useful for consumers who find it difficult or inconvenient to remember or read or key in Internet addresses.

Systems such as the above described do offer features that may be useful for inputting information to an information handling system and even for accessing the Internet. However, it is somewhat limiting to access the Internet by reading special bar codes. Moreover, existing Internet browser programs are conventionally set up to input Internet addresses in normal text characters, so specialized software is required for interfacing to a conventional browser so that the bar codes are presented to the browser as Internet addresses. These limitations may place an burden on web sites that seek to be widely accessible, particularly for web sites that do not have extensive financial resources to harness mass-media consumer channels.

Thus, while some advances have been made in the use of scanners, and even in their use for accessing information on the Internet, a need still exist for improvements.

SUMMARY

In one embodiment of the present invention, a device for capturing information from a document to be input to an information handling system ("IHS") includes a housing that a user may selectively place to reveal a first portion of the document. That is, the housing defines a viewing area, such as by defining an opening through which the first portion of the document may be viewed. The housing has a shutter for selecting a subportion of the first revealed portion of the document by shutting off a portion of the viewing area, thereby hiding a portion of the first revealed portion of the document and revealing only the selected subportion. A scanner for capturing an image of the revealed subportion of the document is movably attached to the housing. The selected subportion of the document could, for example, be limited by the user to an Internet address. In this case, the device may be particularly advantageous for users who find it difficult to remember, or read and key in Internet addresses, since it does not require significant use of a keyboard. Furthermore, it does not require the information to be specially coded, as will be further explained hereinbelow.

In another aspect, the input device includes a magnifying lens for displaying an enlarged view of the portion of the document revealed in the viewing area, so that a user of the input device may more precisely select the subportion of the document. This is particularly helpful for users which are visually impaired.

In another aspect, the shutter has a first and second flap. The flaps are adjustable for shutting off the viewing area in different directions. For example, the first flap may shut off the viewing area in a vertical direction, while the second flap shuts off in a horizontal direction. This permits delimiting the selected subportion of the document both in terms of the height and width of the subportion.

In one embodiment, the first flap is connected to a first shaft, and the first shaft is coupled to a first wheel, so that the user may turn the wheel to retract or extend the first flap and control an extent of vertically shutting off of the viewing area. Likewise, the second flap is connected to a second shaft, positioned substantially perpendicular to the first shaft and coupled to a second wheel, permitting the user to likewise horizontally shut off the viewing area.

In yet another aspect, a motor is attached to the scanner. The motor transports the scanner across the viewing area to capture the image of the revealed subportion of the document. The user may trigger this scanning once the user has positioned the housing and adjusted the flaps so that the only desired subportion of the document will be scanned.

In a method embodiment of the invention, information on a document is captured in a number of steps. First a housing is placed on the document such that a viewing area of the housing reveals a first revealed portion of the document. Next, a subportion of the first revealed portion is selected by shutting off a portion of the viewing area. This hides a portion of the first revealed portion of the document and reveals only the selected subportion. Then an image of the revealed subportion of the document is captured by a scanner attached to the housing.

The method may include a step which is especially helpful for users which are visually impaired. That is the method may include displaying an enlarged view of the portion of the document revealed in the viewing area by a magnifying lens.

In one embodiment, the selecting of the subportion of the document may include adjusting a first and second flap of a shutter to shut off the viewing area in two directions. This may further include turning a first wheel to rotate a first shaft connected to the first flap and retract or extend the first flap in one direction. Likewise a second wheel is turned to rotate a second shaft connected to the second flap and retract or extend the second flap another direction.

In a further aspect, the method includes transporting the scanner across the viewing area, by a motor attached to the scanner, responsive to a demand for the scanner to capture the image of the revealed subportion of the document.

According to the foregoing, the scanner may be coupled to an IHS for transmitting the image thereto. Pursuant to that feature, embodiments of the invention the foregoing apparatus and method may be extended further for capturing a network address from a document and accessing information in a network at the network address. In one such embodiment, an apparatus for accessing information in a network includes an IHS coupled to a network and to the above described input device. The input device has a housing as described hereinabove, and the document has printed characters. At least some of the printed characters define a certain network address, such as an Internet Protocol address, where information may be accessed.

Thus, in a method embodiment, a user may selectively place the above described housing on the document with the viewing area revealing a first portion of the document. Then the user may adjust the input device to reveal only the printed characters that define the certain network address, and trigger the scanner to capture and transmit an image of the characters to the IHS. Then the IHS extracts the characters from the image and accesses the information at the certain network address.

It is a particular advantage of the immediately preceding embodiments that visually impaired users may use the invention to capture Internet addresses from documents, such as magazines, and input them to a computer for browsing the Internet. These and other advantages of the invention will be further apparent from the following drawings and detailed description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 illustrates a shutter of the device of FIG. 1.

FIG. 3 illustrates one of the two flap assemblies for the shutter of FIG. 2.

DETAILED DESCRIPTION OF THE PREFERRED EMBODIMENTS

In the following detailed description of the preferred embodiments, reference is made to the accompanying drawings illustrating embodiments in which the invention may be practiced. It should be understood that other embodiments may be utilized and changes may be made without departing from the scope of the present invention.

Figure 1:
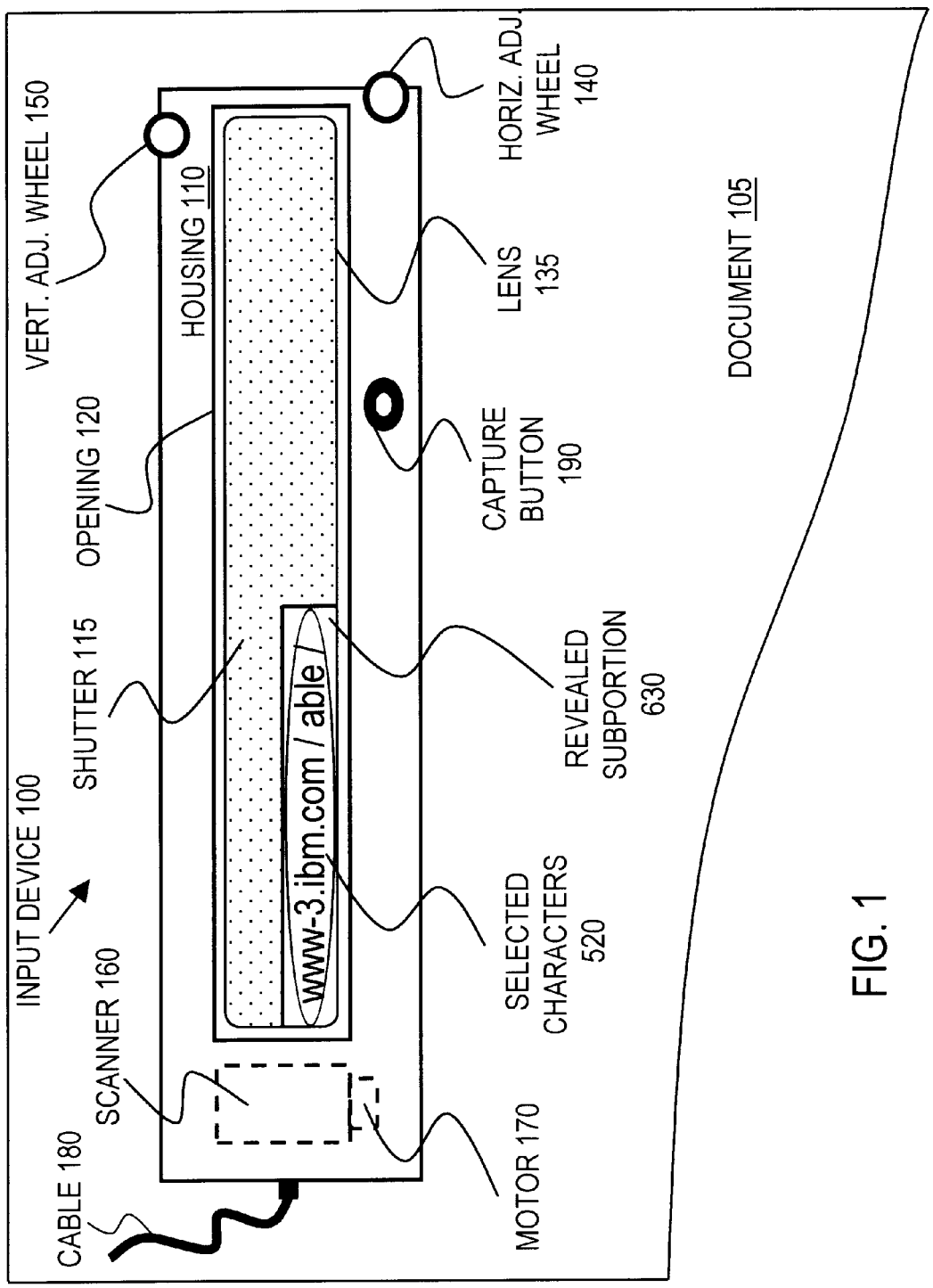
FIG. 1 shows a plan view of an input device according to an embodiment of the invention.

Referring first to FIG. 1, a plan view is shown of a device 100 for capturing information from a document 105 for inputting to an information handling system ("IHS") (not shown). The device 100 includes a housing 110 that a user may selectively place to reveal a "first revealed portion" (described hereinbelow) of the document 105. That is, the housing 110 defines a viewing area, which in FIG. 1 is an opening 120 through which the first portion of the document 105 may be viewed.

Figure 5:
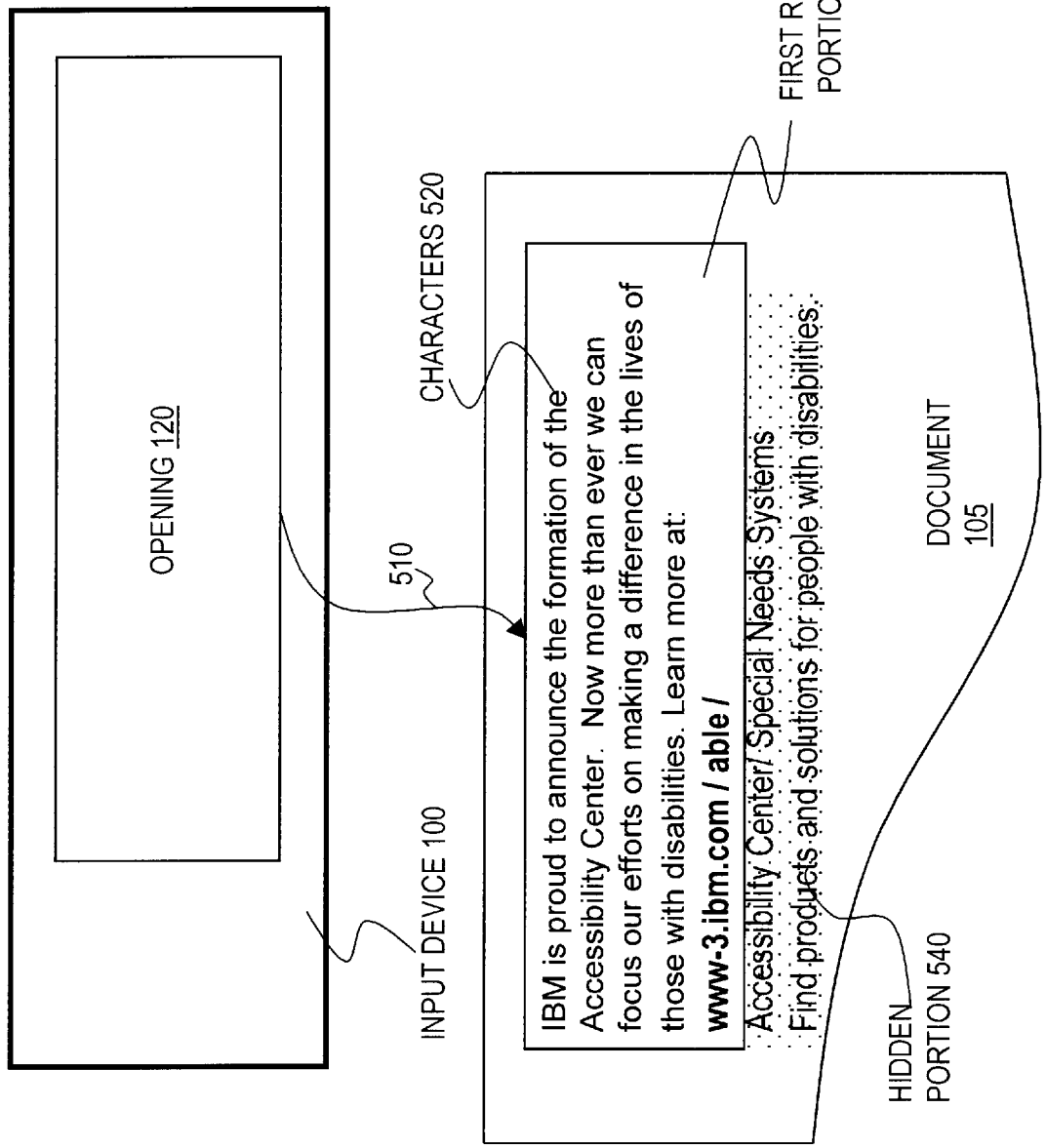
FIGS. 5 and 6 illustrate use of the device with a document, according to an embodiment.

Referring now to FIG. 5, the "first revealed portion" is illustrated. The input device 100 is shown with its opening 120 fully open. With the opening 120 fully open, a viewing area of maximum size is defined. As shown, by connector 510, when the device 100 is placed on a document 105 as indicated, printed characters 520 on the document 105 that fall within a first portion 530 (also referred to as the "first revealed portion 530") corresponding to the opening 120 are revealed through the opening 120. Any other printed characters 520 adjacent to the first revealed portion 530 are hidden by the housing 110, that is, characters 520 in "hidden portion 540.

Figure 6:
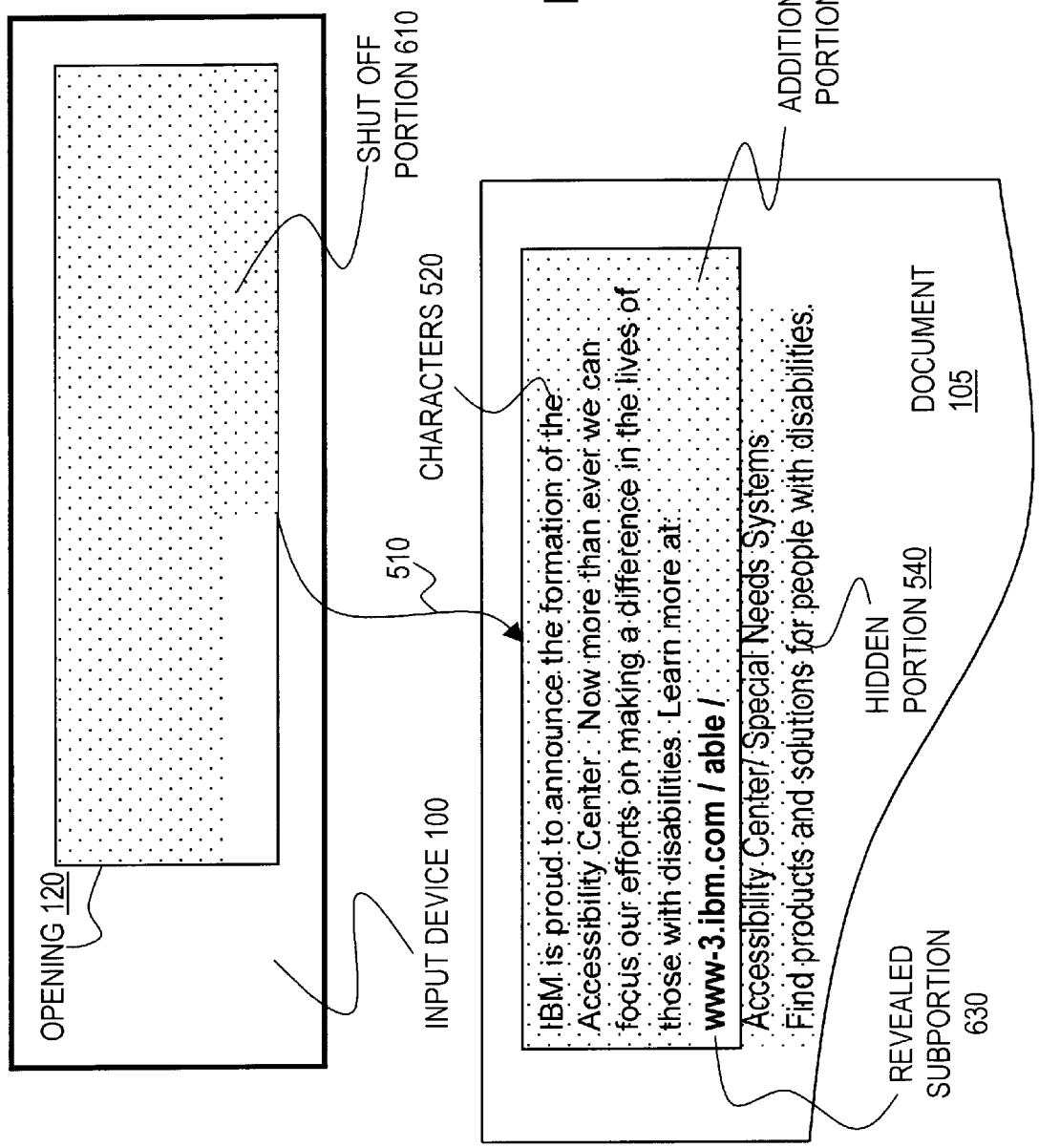

Referring now to FIG. 6, a "revealed subportion" of the first revealed portion 530 is illustrated. In this case, a portion of the opening 120 has been shut off. Thus, when the device 100 is placed on the document 105 as indicated, an additional portion of the printed characters 510 on the document 105 that fall within the first revealed portion 520 are hidden, that is, characters 520 in additional hidden portion 620, so that only a selected subportion 630 of the document 105 is revealed, that is the "revealed subportion" 620.

Referring again to FIG. 1, the input device 100 includes a magnifying lens 135 for displaying an enlarged view of whatever portion of the document 105 revealed in the opening 120. That is, the lens 135 will enlarge either the first revealed portion shown in FIG. 5, if the opening 120 is fully open, or the revealed subportion shown in FIGS. 1 and 6, if the opening 120 is partly shut off. This permits a user of the input device to more precisely select the subportion 620 of the document to be revealed. This is particularly helpful for users which are visually impaired.

The housing 110 has a shutter 115, which is adjusted by vertical adjustment wheel 150 to limit the revealed subportion 630 in the vertical direction, that is, as shown in FIG. 1 to limit in the direction of the up-and-down height of the selected characters 520, so that the selected characters 520 can be limited to one line of characters. The shutter 115 is adjusted by a horizontal adjustment wheel 140 to limit the revealed subportion 630 in the horizontal direction, that is, as shown in FIG. 1, to limit in the characters 520 that are included left-to-right.

A scanner 160 is shown moveably coupled to the housing 110, as will be further described hereinbelow, for capturing an image of the revealed subportion 630 of the document. A motor 170 is attached to the scanner. The motor 170 transports the scanner 160 across the viewing area 120 to capture an image of the revealed subportion 630 of the document. The user may trigger this scanning by pushing the capture button 190 once the user has positioned the housing 110 and adjusted the shutter so that the only desired subportion 630 of the document will be scanned. The scanner may be coupled to an information handling system through the cable 180 shown. (In another embodiment, the scanner may be coupled via wirelessly connection to the IHS.)

Referring now to FIG. 2, the shutter 115 is shown in more detail. In this embodiment, the shutter 115 has vertical and horizontal limit flaps 210 and 220 respectively. The flaps 210 and 220 are adjustable for shutting off the viewing area 120 of FIG. 1 in different directions. In the embodiment shown, the vertical (or "first") flap 210 shuts off the viewing area in a vertical direction, while the horizontal (or "second") flap 220 shuts off in a horizontal direction. As was previously stated, this permits delimiting the selected subportion of the document both in terms of the height and width of the subportion. The first flap 210 is connected to a first shaft, i.e., "vertical flap shaft" 255, which is coupled to a first wheel, i.e., the "vertical adjustment wheel 150, through a vertical adjustment gear 250. Thus, the user may turn the wheel 150 to retract or extend the first flap 210 and control an extent of vertically shutting off of the viewing area 120 in FIG. 1. Likewise, the second flap 220 is connected to a second shaft, i.e., "horizontal flap shaft" 245, positioned substantially perpendicular to the first shaft 255 and coupled to a second wheel, i.e., the horizontal adjustment wheel 140, through a horizontal adjustment gear 240, permitting the user to likewise horizontally shut off the viewing area.

As indicated in FIG. 2 by the cross section line 3—3, additional details are shown in FIG. 3 for the horizontal flap 220.

Referring now to FIG. 3, a flap assembly 300 is shown. As can be seen from this view, by turning the horizontal adjustment wheel 140, which engages the horizontal adjustment gear 240, the horizontal flap shaft 245 is rotated. The horizontal limit flap 220 is connected to the shaft 245, so that rotating the shaft causes the flap 220 to either roll-up or unroll, depending on the direction of rotation. If the flap 220 rolls up on the shaft 245 this causes the flap 220 to retract. Conversely, if the flap 220 unrolls, the flap extends.

Figure 4:
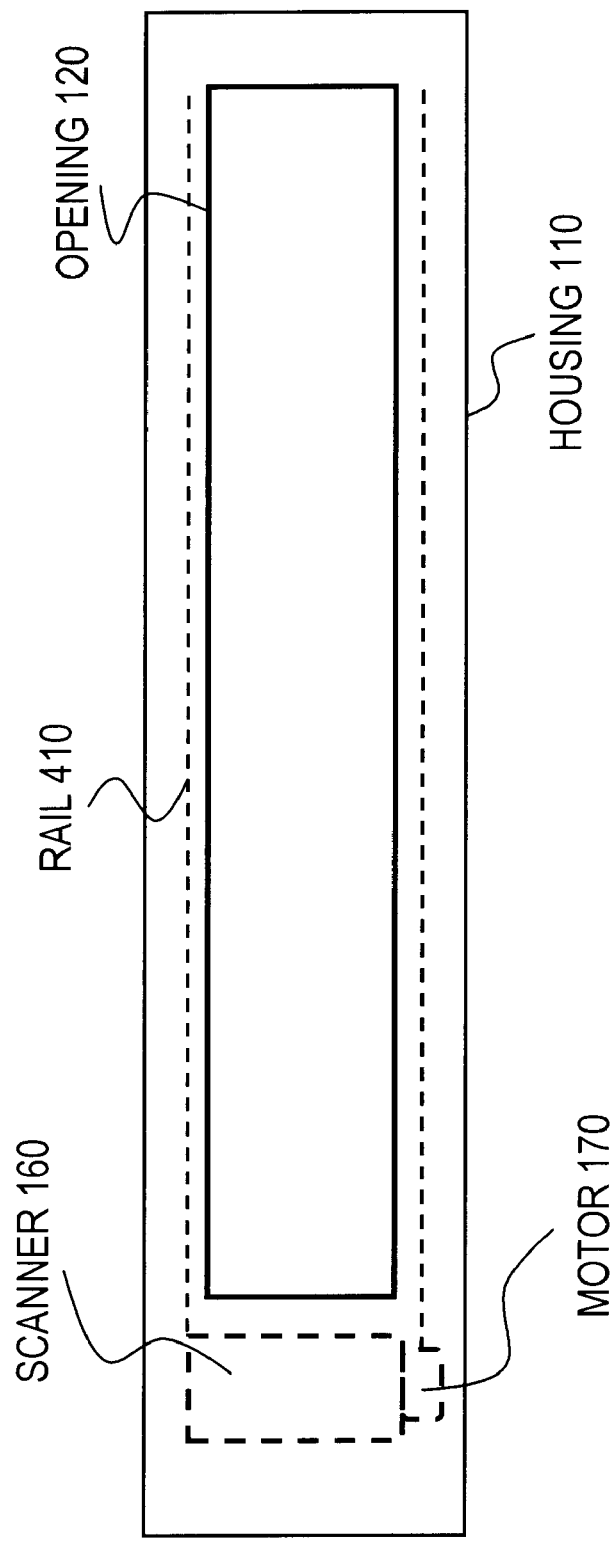
FIG. 4 illustrates the scanner and scanner motor of the device of FIG. 1.

Referring now to FIG. 4, further details are shown for the movable mounting of the scanner 160 and motor 170 to the housing. In the embodiment, two rails 410 are mounted on the housing, and the scanner 160 and motor 170 ride on the rails 410, so that the scanner may be transported by the motor, as previously described.

Figure 7:
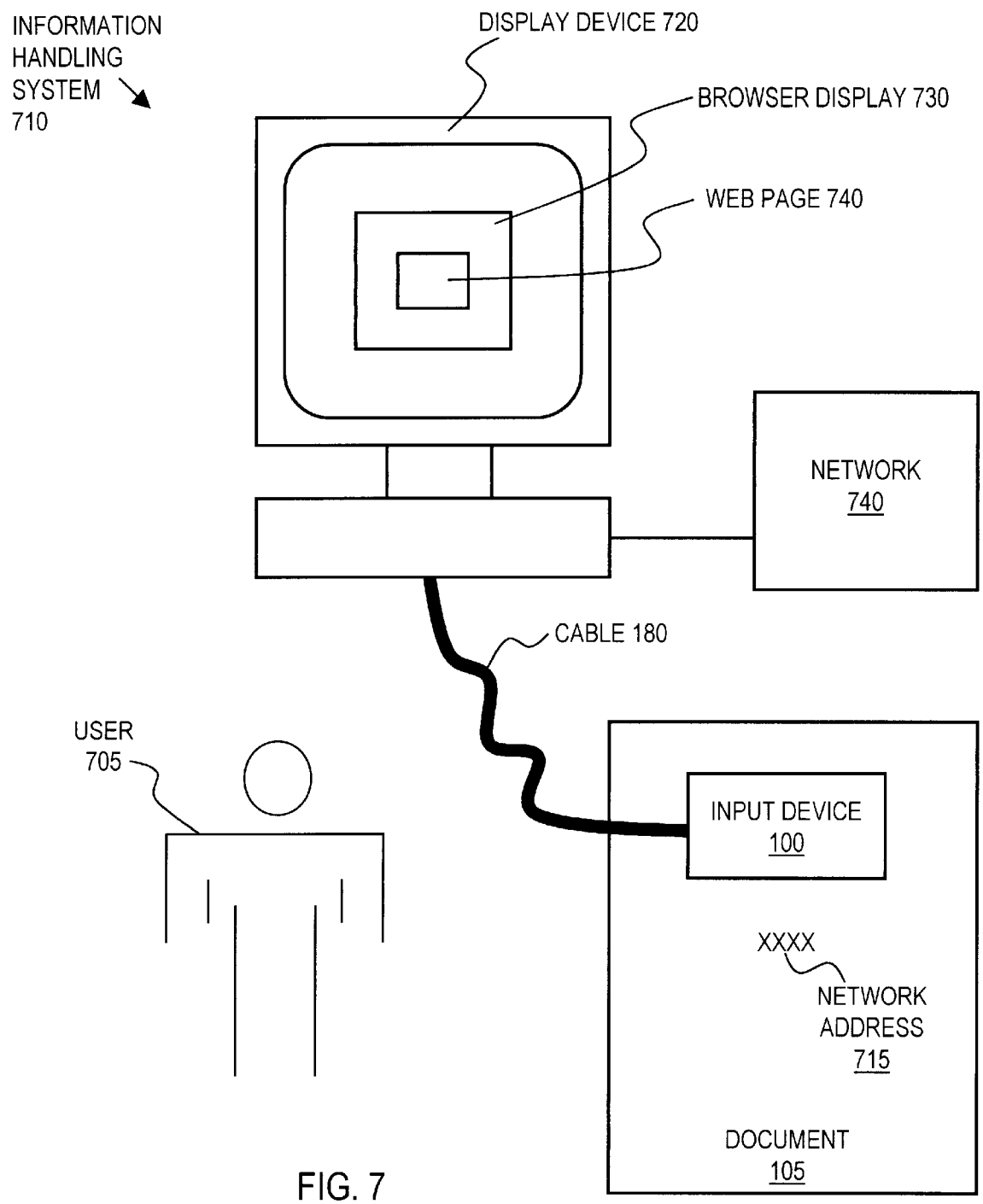
FIG. 7 illustrates an information handling system coupled to a network and to the input device of FIG. 1, according to an embodiment.

Referring now to FIG. 7, the scanner 160 (not shown) of the input device 100 may be coupled to an IHS 710 for transmitting a captured image thereto. As shown, user 705 positions the input device 100 on the document 105. By adjusting the shutter 115 (FIG. 1) selected characters on the document 105 may be limited to characters defining a network address 715, such as the Internet address "www-3.ibm.com/able" as shown in FIGS. 1 and 6. The characters defining this address may be captured in the image, and transmitted to the IHS 710. A program in the IHS for recognizing characters and extracting them from an image, such as is well known, runs on the IHS, extracts the characters, submits them to a browser program also running on the IHS. The browser program treats the characters as an Internet address, and submits them as a request to the network 740. When the network returns a web page 740 from the address, the browser program displays the web page 740 on a browser display 730 shown on a display device 720 of the IHS 710.

Figure 8:
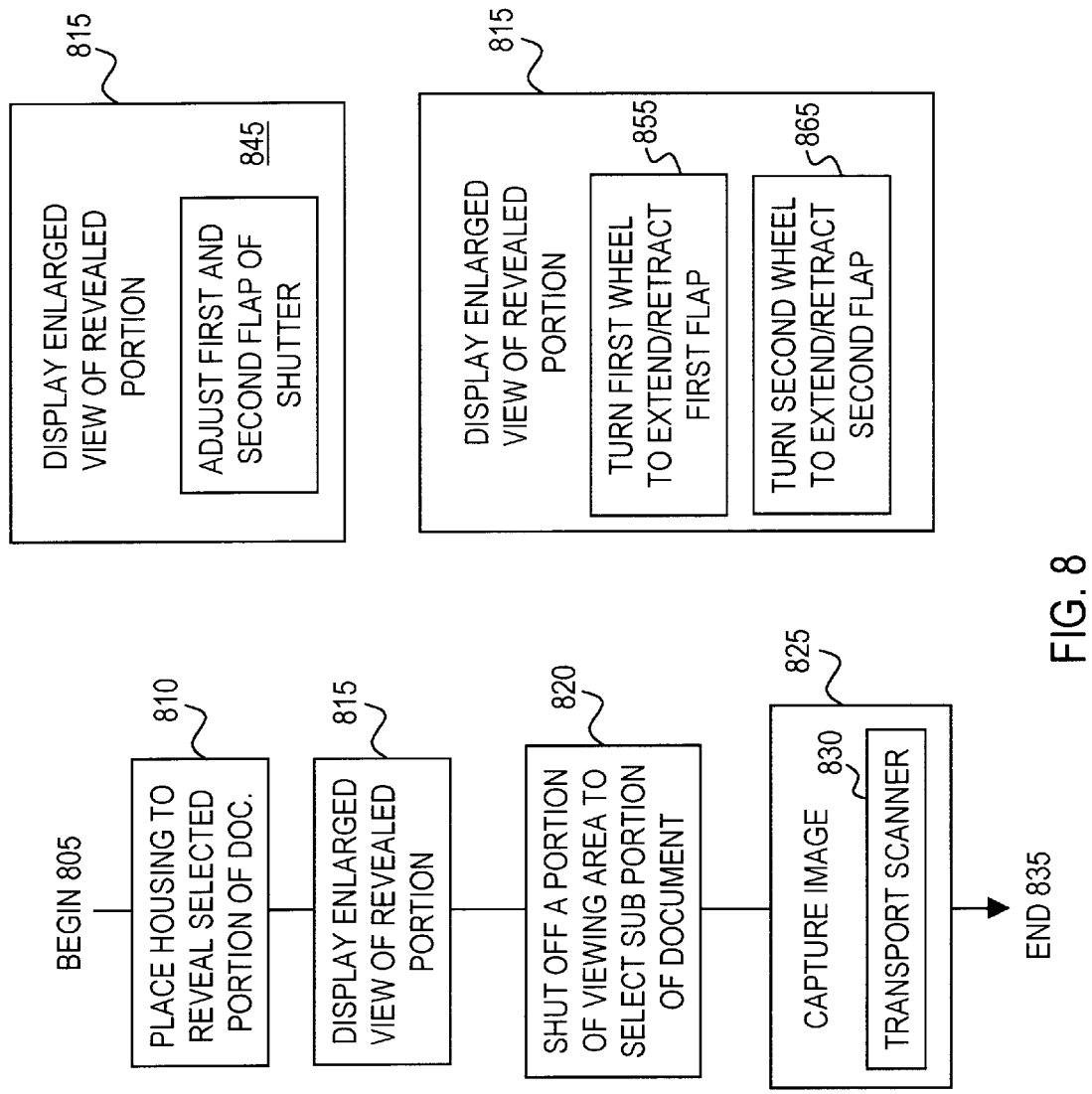
FIG. 8 illustrates method steps, according to one embodiment.

Referring now to FIG. 8, steps for a method embodiment of the invention is illustrated, beginning at step 805, according to which information on a document is captured in a number of steps. In the first step of substance, step 810, a housing is placed on the document such that a viewing area of the housing reveals a first revealed portion of the document. In the embodiment illustrated here, step 815 is included, which is especially helpful for users which are visually impaired. That is, an enlarged view is displayed by a magnifying lens of the portion of the document revealed in the viewing area. Next, in step 820, a subportion of the first revealed portion is selected by shutting off a portion of the viewing area. This hides a portion of the first revealed portion of the document and reveals only the selected subportion. Then, in step 825, an image of the revealed subportion of the document is captured by a scanner attached to the housing.

In the embodiment illustrated, step 830 is included in step 825, according to which the method includes transporting the scanner across the viewing area, by a motor attached to the scanner. This may be done responsive to a user demand for the scanner to capture the image of the revealed subportion of the document.

The method embodiment illustrated in FIG. 8 ends at step 835, as shown. However, it should be understood that there may be additional steps. For example details of step 815 are shown for two additional embodiments. That is, a first additional embodiment is shown, according to which, in step 845, a first and second flap of a shutter are adjusted to shut off the viewing area in two directions. In a second additional embodiment, a first wheel is turned, in step 855, to rotate a first shaft connected to the first flap and retract or extend the first flap in one direction. Then, in step 865, a second wheel is turned to rotate a second shaft connected to the second flap and retract or extend the second flap another direction.

Figure 9:
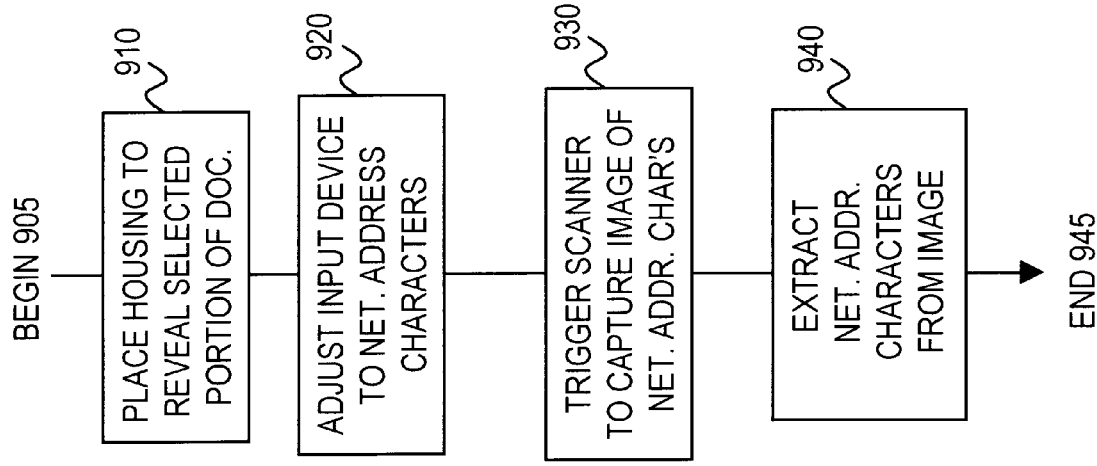
FIG. 9 illustrates method steps, according to another embodiment.

Referring now to FIG. 9, steps of another method embodiment are illustrated, beginning at step 905. At the first step of substance, step 910, a user selectively places the above described housing on a document with the viewing area revealing a first portion of the document. Then, at 920, the user adjusts the input device to reveal only printed characters that define a certain network address. Then, at 930, the user triggers the scanner to capture and transmit an image of the characters to an IHS. Then, at 940, the IHS extracts the characters from the image and accesses the information at the certain network address. This may include the IHS running a first program to recognize and extract the characters, and a second program to interface the network and display information from the network to the user, as was described in connection with FIG. 7.

Figure 10:
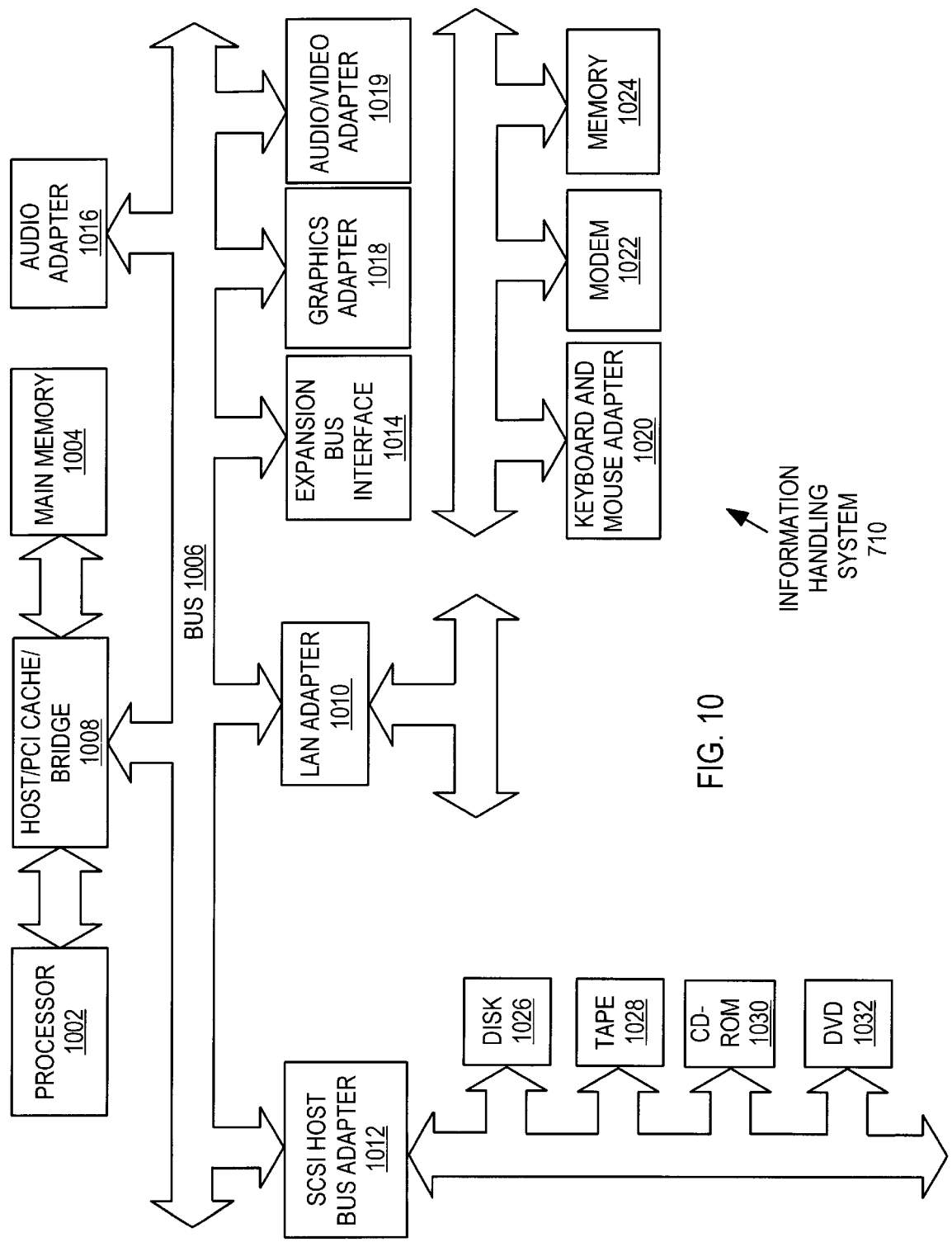
FIG. 10 illustrates an embodiment of the information handling system of FIG. 7.

With reference now to FIG. 10, a block diagram of a information handling system 710 is illustrated, according to an embodiment. Information handling system 710 employs a peripheral component interconnect (PCI) local bus architecture. Although the depicted example employs a PCI bus, other bus architectures, such as Universal Serial Bus, Micro Channel and ISA, may be used. Processor 1002 and main memory 1004 are connected to PCI local bus 1006 through PCI bridge 1008. PCI bridge 1008 may also include an integrated memory controller and cache memory for processor 1002. Additional connections to PCI local bus 1006 may be made through direct component interconnection or through add-in boards. In the depicted example, local area network (LAN) adapter 1010, SCSI host bus adapter 1012, and expansion bus interface 1014 are connected to PCI local bus 1006 by direct component connection. In contrast, audio adapter 1016, graphics adapter 1018, and audio/video adapter (A/V) 1019 are connected to PCI local bus 1006 by add-in boards inserted into expansion slots. Expansion bus interface 1014 provides a connection for a keyboard and mouse adapter 1020, modem 1022, and additional memory 1024. In the depicted example, SCSI host bus adapter 1012 provides a connection for hard disk drive 1026, tape drive 1028, CD-ROM drive 1030, and digital video disc read only memory drive (DVD-ROM) 1032. Typical PCI local bus implementations will support three or four PCI expansion slots or add-in connectors.

An operating system runs on processor 1002 and is used to coordinate and provide control of various components within information handling system 710 in FIG. 10. The operating system may be a commercially available operating system, such as AIX, which is available from International Business Machines Corporation. "AIX" is a trademark of International Business Machines Corporation. An object oriented programming system, such as Java, may run in conjunction with the operating system, providing calls to the operating system from Java programs or applications executing on information handling system 710. Instructions for the operating system, the object-oriented operating system, and applications or programs are located on a storage device, such as hard disk drive 1026, and may be loaded into main memory 1004 for execution by processor 1002.

It should be understood from the foregoing, that it is a particular advantage of the immediately preceding embodiments that visually impaired users may use the invention to capture Internet addresses from any printed material, which may even include product packaging, and input them to a computer for browsing the Internet. The invention is also advantageous for users who have an impaired ability to use a keyboard. The description of the present embodiment has been presented for purposes of illustration, but is not intended to be exhaustive or to limit the invention to the form disclosed.

Many modifications and variations will be apparent to those of ordinary skill in the art. For example, with the long-standing trend to ever-increasing computing power in devices of ever-decreasing size, another variation of the illustrated embodiments concerns moving functions described hereinabove from the information handling system to the input device itself. For example, although it has been described that the scanner sends an image to the IHS and the IHS extracts text from the image, it should be understood that an embodiment is contemplated wherein the scanner includes processing functions which permit the scanner to extract text from the image, so that the scanner sends text to the IHS rather than an image of text. Likewise, the IHS is depicted as a conventional desktop machine, but it should be understood that the IHS could be a portable device, including a small device such as a personal digital assistant.

The embodiment was chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. An input device for an information handling system, the input device comprising:
    a housing having a shape that defines a viewing area, so that a user may selectively place the housing on a document with the viewing area revealing a first revealed portion of the document;
    a shutter attached to the housing, for selecting a subportion of the first revealed portion of the document by shutting off a portion of the viewing area, thereby hiding a portion of the first revealed portion of the document and revealing only the selected subportion; and
    an scanner attached to the housing, for capturing an image of the revealed subportion of the document;
    wherein the shutter has a first and second flap, the flaps being adjustable for shutting off the portion of the viewing area in respective first and second directions.

2. The input device of claim 1 comprising:
    a magnifying lens for displaying an enlarged view of the portion of the document revealed in the viewing area, so that a user of the input device may more precisely select the subportion of the document.

3. The input device of claim 1, wherein the first flap is connected to a first shaft, and the first shaft is coupled to a first wheel, so that the user may turn the wheel to retract or extend the first flap and control an extent of the shutting off of the viewing area in the first direction.

4. The input device of claim 3, wherein the second flap is connected to a second shaft, and the second shaft is positioned substantially perpendicular to the first shaft and coupled to a second wheel, so that the user may turn the second wheel to retract or extend the tape and control an extent of the shutting off of the viewing area in the second direction.

5. The input device of claim 1, comprising a motor attached to the scanner for transporting the scanner across the viewing area responsive to a demand for the scanner to capture the image of the revealed subportion of the document.

6. The input device of claim 1, wherein the scanner is capable of being coupled to an information handling system for transmitting the captured image to the information handling system.

7. An input device for an information handling system, the input device comprising:
    a housing having a shape that defines a viewing area, so that a user may selectively place the housing on a document with the viewing area revealing a first revealed portion of the document;
    a shutter attached to the housing, for selecting a subportion of the first revealed portion of the document by shutting off a portion of the viewing area, thereby hiding a portion of the first revealed portion of the document and revealing only the selected subportion, wherein the shutter has a first and second flap, the flaps being adjustable for shutting off the portion of the viewing area in respective first and second directions;
    a magnifying lens for displaying an enlarged view of the portion of the document revealed in the viewing area, so that a user of the input device may more precisely select the subportion of the document;
    an scanner attached to the housing; and
    a motor attached to the scanner for transporting the scanner across the viewing area responsive to a demand for the scanner to capture an image of the revealed subportion of the document, wherein the scanner is capable of being coupled to an information handling system for transmitting the captured image to the information handling system.

8. The input device of claim 7, wherein the first flap is connected to a first shaft, and the first shaft is coupled to a first wheel, so that the user may turn the wheel to retract or extend the first flap and control an extent of the shutting off of the viewing area in the first direction.

9. The input device of claim 8, wherein the second flap is connected to a second shaft, and the second shaft is positioned substantially perpendicular to the first shaft and coupled to a second wheel, so that the user may turn the second wheel to retract or extend the tape and control an extent of the shutting off of the viewing area in the second direction.

10. A method for capturing information comprising the step of:
- a) placing a housing having a shape that defines a viewing area on a document with the viewing area revealing a first revealed portion of the document;
- b) selecting a subportion of the first revealed portion by shutting off a portion of the viewing area, thereby hiding a portion of the first revealed portion of the document and revealing only the selected subportion;
- d) capturing an image of the revealed subportion of the document by a scanner attached to the housing, wherein the step b) comprises the step of:
- b1) adjusting a first and second flap of a shutter to shut off the portion of the viewing area in respective first and second directions.

11. The method of claim 10 comprising the step of:
displaying an enlarged view of the portion of the document revealed in the viewing area by a magnifying lens, so that a user of the input device may more precisely select the subportion of the document.

12. The method of claim 10, wherein step b1) comprises the step of:
- b1a) turning a first wheel to rotate a first shaft connected to the first flap and retract or extend the first flap in the first direction.

13. The method of claim 12, wherein step b1) comprises the step of:
- b1b) turning a second wheel to rotate a second shaft connected to the second flap and retract or extend the second flap in the second direction.

14. The method of claim 10, comprising the step of:
transporting the scanner across the viewing area, by a motor attached to the scanner, responsive to a demand for the scanner to capture the image of the revealed subportion of the document.

15. The method of claim 10, comprising the step of:
transmitting the captured image to an information handling system.

16. A method for capturing information comprising the step of:
- a) placing a housing having a shape that defines a viewing area on a document with the viewing area revealing a first revealed portion of the document;
- b) displaying an enlarged view of the portion of the document revealed in the viewing area by a magnifying lens, so that a user of the input device may more precisely select a subportion of the document;
- c) selecting the subportion of the first revealed portion by shutting off a portion of the viewing area, which includes adjusting a first and second flap of a shutter to shut off the portion of the viewing area in respective first and second directions, thereby hiding a portion of the first revealed portion of the document and revealing only the selected subportion; and
- d) capturing an image of the revealed subportion of the document by a scanner attached to the housing, which includes transporting the scanner across the viewing area, by a motor attached to the scanner, responsive to a demand for the scanner to capture the image of the revealed subportion of the document.

17. The method of claim 16, comprising the step of:
transmitting the captured image to an information handling system.

18. The method of claim 16, wherein step c) comprises the step of:
- c1) turning a first wheel to rotate a first shaft connected to the first flap and retract or extend the first flap in the first direction.

19. The method of claim 18, wherein step c) comprises the step of:
- c2) turning a second wheel to rotate a second shaft connected to the second flap and tend the second flap in the second direction.

20. An apparatus for accessing information in a network, comprising:
- an information handling system coupled to a network for accessing information at a network address selected by a user;
- an input device coupled to the information handling system, for capturing a network address from a document, wherein the input device comprises:
  - a housing having a shape that defines a viewing area, so that a user may selectively place the housing on a document with the viewing area revealing a first revealed portion of the document, wherein a subportion of the first revealed portion of the document has printed characters therein, at least some of the printed characters defining a certain network address;
  - a shutter attached to the housing, for selecting the subportion of the first revealed portion of the document by shutting off a portion of the viewing area, thereby hiding a portion of the first revealed portion of the document and revealing only the selected subportion; wherein the shutter has a first and second flap, the flaps being adjustable for shutting off the portion of the viewing area in respective first and second directions; and
  - an scanner attached to the housing, for capturing an image of the revealed subportion of the document and transmitting the image to the information handling systems;
- wherein the information handling system extracts the characters from the image and accesses the information at the certain network address.

21. The apparatus of claim 20, wherein the input device comprises a magnifying lens for displaying an enlarged view of the portion of the document revealed in the viewing area, so that a user of the input device may more precisely select the subportion of the document.

22. A method for accessing information in a network, comprising the steps of:
- a) placing a housing having a shape that defines a viewing area on a document with the viewing area revealing a first revealed portion of the document, wherein a subportion of the first revealed portion of the document has printed characters therein, at least some of the printed characters defining a certain network address;
- b) selecting the subportion of the first revealed portion by shutting off a portion of the viewing area, which includes adjusting a first and second flap of a shutter to shut off the portion of the viewing area in respective first and second directions, thereby hiding a portion of the first revealed portion of the document and revealing only the selected subportion;

d) capturing an image of the revealed subportion of the document by a scanner attached to the housing;
e) transmitting the image to an information handling system coupled to a network;
f) extracting the characters from the image by the information handling system; and
g) accessing the information at the certain network address by the information handling system.

23. The method of claim 22 comprising the step of:

displaying an enlarged view of the portion of the document revealed in the viewing area by a magnifying lens, so that a user of the input device may more precisely select the subportion of the document.

\* \* \* \* \*

UNITED STATES PATENT AND TRADEMARK OFFICE
CERTIFICATE OF CORRECTION

PATENT NO.    : 6,833,936 B1
DATED         : December 21, 2004
INVENTOR(S)   : Seymour It is certified that error appears in the above-identified patent and that said Letters Patent is hereby corrected as shown below:

Column 10,
Line 10, please delete "tend" and insert -- extend --.

Signed and Sealed this

Twenty-sixth Day of April, 2005

JON W. DUDAS
*Director of the United States Patent and Trademark Office*